United States Patent [19]

Zosel

[11] 4,247,570

[45] Jan. 27, 1981

[54] PROCESS FOR THE DECAFFEINATION OF COFFEE

[75] Inventor: Kurt Zosel, Oberhausen, Fed. Rep. of Germany

[73] Assignee: Studiengesellschaft Kohle mbH, Kaiser-Wilhelm Platz, Fed. Rep. of Germany

[21] Appl. No.: 798,744

[22] Filed: May 19, 1977

[30] Foreign Application Priority Data

Aug. 4, 1976 [AT] Austria .................................. 5769/76
Oct. 20, 1976 [AT] Austria .................................. 7806/76
Dec. 14, 1976 [AT] Austria .................................. 9248/76

[51] Int. Cl.$^3$ ..................................... A23F 5/20
[52] U.S. Cl. ..................................... 426/481; 426/427
[58] Field of Search ................... 426/427, 428, 481

[56] References Cited

U.S. PATENT DOCUMENTS

| | | | |
|---|---|---|---|
| 1,930,257 | 10/1933 | Stelkens | 426/595 X |
| 2,198,859 | 4/1940 | Bürgin | 426/427 X |
| 2,375,550 | 5/1945 | Grossman | 426/427 X |
| 3,418,134 | 12/1968 | Rooker | 426/386 |
| 3,806,619 | 4/1974 | Zosel | 426/427 X |
| 3,843,824 | 10/1974 | Roseluis et al. | 426/427 X |
| 3,879,569 | 4/1975 | Vetzbium et al. | 426/427 |

FOREIGN PATENT DOCUMENTS

| | | | |
|---|---|---|---|
| 553800 | 7/1932 | Fed. Rep. of Germany | 426/427 |
| 775227 | 7/1934 | France | 426/427 |

*Primary Examiner*—Joseph M. Golian
*Attorney, Agent, or Firm*—Sprung, Felfe, Horn, Lynch & Kramer

[57] ABSTRACT

In the decaffeination of coffee by contacting the coffee with water-moist carbon dioxide above its critical temperature and critical pressure, during the contacting, the coffee is maintained in admixture with an adsorbent for the caffeine for takeup of caffeine from the carbon dioxide by the adsorbent.

18 Claims, No Drawings

PROCESS FOR THE DECAFFEINATION OF COFFEE

BACKGROUND

In Austrian Pat. No. 290,962, and in U.S. Application Ser. No. 364,190, filed May 25, 1973, there is described a process for the decaffeination of coffee. In accordance with this process a pressure vessel is charged with coffee which can be raw coffee having a water content of 9%, i.e. 'dry' coffee. Water which is additionally present in the pressure vessel is used for moistening coffee (enlarging the water content of the raw coffee above the normal water content of about 9%). Supercritical carbon dioxide at a pressure of 120 to 180 atmospheres is passed through the coffee in the pressure vessel at a temperature of about 40° to 80° C. The supercritical carbon dioxide is circulated through the coffee in the pressure vessel with a circulation pump. The supercritical carbon dioxide after passing through the coffee and removing the caffeine is then passed through a second pressure vessel containing active charcoal which removes the caffeine from the carbon dioxide.

In that procedure, moistening of the coffee in the pressure vessel is effected by the circulating wet supercritical carbon dioxide. As a result the coffee, which swells due to the uptake of water, becomes deformed and packs together making it difficult to empty the containers. An additional problem is that on scaling up the procedure it is very difficult in large pressure vessels to pump supercritical carbon dioxide at a uniform flow rate through the whole flow cross-section of a large quantity of coffee. Flow channels, in which the gas flows very rapidly, and zones where the rate of flow is minimal, are invariably formed. By suitable design and modification of the pressure vessel it is possible to reduce this unfavorable situation but it cannot be completely eliminated. As a result the coffee in a particular charge is decaffeinated to different extents.

The amount of caffeine which can be taken up by a given amount of circulating supercritical carbon dioxide, and which is also carried into the adsorption container, is dependent, among other things, upon the residual caffeine content of the beans.

As a result, during decaffeination the gas which streams through the flow channels—and this is frequently the largest fraction—carries only a small amount of caffeine to the active charcoal.

In order to reduce the average caffeine content in a charge to approximately 0.05%, it is necessary to increase the time of treatment of 20–25 h. An increase in the total circulation does not lead to any significant reduction in the length of time of treatment.

After decaffeination the wet coffee is dried in the same apparatus. This has turned out to be a disadvantage because the beans do not contract to their original volume and this is disadvantageous for further processing.

THE INVENTION

Surprisingly, it has now been discovered that all these disadvantages, including the long contacting times, can be avoided by the following much simpler process:

The pressure vessel is charged with a mixture of moistened coffee (water content approximately 15–60%) and, for instance, active charcoal, as a solid adsorbent for caffeine, and treated in a stationary process with supercritical $CO_2$ at 120–250 atm. and 40°–100° C. Alternately, the pressure vessel can be charged with coffee having a water content of about 9% and adsorbent which has been moistened with water, i.e., the water can be mixed with the adsorbent. As no special arrangement is required to recover caffeine from the supercritical $CO_2$ stream, a considerable reduction in the technical layout is achieved. In addition, the decaffeination time is decreased by more than half. Packing is no longer observed. After decaffeination, the mixture is removed and the coffee and active charcoal separated by simple sieving. Finally, the coffee is dried and the coffee particles, e.g. coffee beans, return to their original volume.

It was also found now that the duration of treatment of the coffee can be further reduced essentially by the fact that ground coffee is used as starting material for the decaffeination. This modification of the decaffeination can be specifically used in cases in which ground, decaffeinated, roasted coffee or water-soluble, decaffeinated powder-coffee or granulated coffee are sold.

Instead of active charcoal other solid adsorption agents can be used. Thus, activated aluminum oxide (specific surface size 100–350 $m^2/g$), bleach earth on the basis of aluminum—and/or magnesium silicate, silica gel having a surface rich leaf structure or other adsorption agents being effective in the same manner can be used.

Thus the invention provides an improvement in the process of decaffeination of coffee by contacting the coffee with water-moist carbon dioxide above its critical temperature and critical pressure, the improvement involving maintaining the coffee admixed with an adsorbent for the caffeine for take-up of caffeine from the carbon dioxide by the absorbent. The admixture of coffee and adsorbent can be a stationary bed.

By the process of the invention the caffeine content can be reduced to 0.6%, preferably 0.02%, in contacting time of less than 20, preferably less than 10 hours for the beans and contacting time of less than 5 hours, preferably less than 2 hours for ground coffee.

The coffee can be raw or roasted. If roasted, the water-moist carbon dioxide takes up aromatics as well as caffeine and the charcoal takes up both the caffeine and the aromatics.

The following examples illustrate the process here described.

EXAMPLE 1

10 kg of moistened coffee having a water content of 40% thoroughly mixed with 7 kg of active charcoal (particle size about 3 mm) were charged into a pressure vessel heated by an external heating jacket to 80° C. Carbon dioxide was pressured into the container at 190 atm. After 15 h the carbon dioxide was vented, the mixture removed and the coffee separated from the active charcoal by sieving. The coffee had a residual caffeine content of 0.02%.

EXAMPLE 2

10 kg of moistened coffee having a water content of 50% were mixed with 5 kg of active charcoal and treated, in the same pressure vessel as in Example 1, for 9 h with carbon dioxide at 240 atm and 90° C. After separation of the coffee from the active charcoal by sieving, the coffee had a residual caffeine content of 0.05%. No difference in the degree of decaffeination within the charge was found.

EXAMPLE 3

0.5 kg coffee having a water content of 40% was mixed together with 0.5 kg silica gel and heated in an autoclave during 18 hours at a temperature of 80° C. and a carbon dioxide pressure of 240 atm. After separation of coffee from silica gel the residual content of caffeine in the coffee was 0.6%.

EXAMPLE 4

1 kg raw coffee beans having a water content of 9% were mixed with 1 kg active charcoal, to which 0.5 kg water was added before mixing. The mixture was heated to 80° C. and carbon dioxide pressed on up to 220 atm for a time of 16 hours. Carbon dioxide was vented and the active charcoal separation from the coffee. The water content of the coffee was 35%. The coffee had a residual caffeine content of 0.065%.

EXAMPLE 5

1 kg raw coffee having a water content of 35% was ground and mixed together with 1/2 kg active charcoal (granuals). The mixture was heated in an autoclave during 3 hours up to a temperature of 80° C. under a carbon dioxide pressure of 190 atm. Thereafter the ground coffee was separated from the charcoal through a sieve. The residual content of caffeine in the coffee was 0.032%. The charcoal granules were cylindrical particles of 4 mm diameter and 6 mm length; the ground coffee particles were between 0.3 and 1.8 mm.

EXAMPLE 6

1 kg raw coffee having a water content of 55% was ground and mixed together with 0.2 kg active charcoal (granuals). The mixture was heated in an autoclave during 1 hour at a temperature of 85° C. and a carbon dioxide pressure of 220 atm. Thereafter the ground coffee was separated from the active charcoal through a sieve. The residual content of caffeine in the coffee was 0.036%. The size of the charcoal granules and the coffee particles was as in Example 5.

What is claimed is:

1. In the process for the decaffeination of coffee which comprises contacting the coffee with water-moist carbon dioxide above its critical temperature and critical pressure to effect removal of caffeine therefrom, the improvement which comprises during said contacting maintaining the coffee admixed with an adsorbent for caffeine for take-up of caffeine from the carbon dioxide by the adsorbent.

2. Process of claim 1, wherein the adsorbent is of the group active charcoal and silica gel.

3. Process of claim 1, wherein the adsorbent is active charcoal.

4. Process of claim 1, wherein the adsorbent is silica gel.

5. Process of claim 1, wherein the coffee is in the form of coffee beans.

6. Process of claim 1, wherein the coffee is in the form of ground coffee.

7. Process of claim 1, wherein said contacting is carried out at a pressure of 120 to 250 atm. and a temperature of 40° to 100° C.

8. Process of claim 1, wherein the admixture of coffee and adsorbent is a stationary bed.

9. Process of claim 1, wherein the coffee is raw coffee.

10. Process of claim 1, wherein the coffee is raw coffee, the adsorbent is charcoal, and the contacting is carried out at a pressure of 120 to 250 atm, and a temperature of 40° to 100° C.

11. Process of claim 1, wherein for said contacting the coffee is moistened and thereafter admixed with the adsorbent.

12. Process of claim 1, wherein for said contacting the adsorbent is moistened with water.

13. Process of claim 1, wherein said contacting is performed as a stationary process.

14. Process of claim 3, wherein said contacting is performed as a stationary process.

15. Process of claim 4, wherein said contacting is performed as a stationary process.

16. Process of claim 10, wherein said contacting is performed as a stationary process.

17. Process of claim 1, wherein the coffee is in the form of coffee particles, and following said contacting the coffee particles and adsorbent are separated.

18. Process of claim 17, wherein said contacting is performed as a stationary process.

* * * * *